Patented Oct. 6, 1953

2,654,729

UNITED STATES PATENT OFFICE 2,654,729

POLYMERIZABLE COMPOSITIONS COMPRISING AN UNSATURATED QUATERNARY AMMONIUM COMPOUND AND POLYMERIZATION PRODUCTS THEREOF

John A. Price, Stamford, Conn., assignor to American Cyanamid Company, New York, N. Y., a corporation of Maine No Drawing. Application July 28, 1952, Serial No. 301,365

17 Claims. (Cl. 260—85.5)

This invention relates to the production of new materials having valuable and characteristic properties that make them especially suitable for use in industry, for example in molding, casting, coating, electrically insulating, fiber-forming and other applications. More particularly the invention is concerned with polymerizable compositions comprising (1) an unsaturated quaternary ammonium compound represented by the general formula I
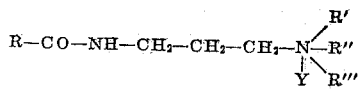

where R, R', R'', R''' and Y have the meanings hereinafter given and (2) a compound which is different from the compound of (1), is co-polymerizable therewith and contains a $CH_2=C<$ grouping, e. g., styrene, acrylonitrile, methyl acrylate, diallyl phthalate, etc. The quaternary ammonium compound of (1) constitutes from about 1% to about 50% and, in most cases, from 1% to 20 or 30% of the total amount of (1) and (2). The scope of the invention also includes products comprising the polymerized composition obtained by polymerization of the aforementioned polymerizable composition, as well as method features whereby new and useful synthetic compositions are produced.

With further reference to Formula I, R represents an aliphatic (including alicyclic) radical containing at least 7 carbon atoms, R' represents an ethylenically unsaturated hydrocarbon radical having a terminal

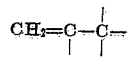

grouping and containing from 3 to 10 carbon atoms, inclusive, R'' represents a radical selected from the class consisting of alkyl and hydroxyalkyl radicals containing from 1 to 5 carbon atoms, inclusive, R''' represents a radical selected from the class consisting of alkyl, hydroxyalkyl and aralkyl radicals, and Y represents an anion.

Illustrative examples of radicals, more particularly aliphatic (including alicyclic) hydrocarbon radicals, represented by R in Formula I are heptyl, heptenyl, nonyl, nonenyl, undecyl, undecenyl, tridecyl, tridecenyl, pentadecyl, pentadecenyl, heptadecyl, heptadecenyl, nonadecyl, nonadecenyl, cyclopentyl, cyclopentenyl, cyclohexyl, cyclohexenyl, cycloheptyl, cycloheptenyl, the residue ($C_{19}H_{29}$) of abietic acid; etc. Illustrative examples of ethylenically unsaturated hydrocarbon radicals represented by R' in Formula I are allyl ($CH_2=CH-CH_2-$), methallyl $[CH_2=C(CH_3)-CH_2-$ or 
$CH_2=CH-CH(CH_3)-]$ ethallyl, propallyl, phenylallyl, tolyallyl, etc. Illustrative examples of alkyl and hydroxyalkyl radicals represented by R'' in Formula I are methyl, ethyl, propyl, isopropyl, n-butyl, isobutyl, sec.-butyl, tert.-butyl, n-amyl, isoamyl, sec.-amyl, tert.-amyl and the other isomeric amyl radicals; hydroxyethyl, hydroxypropyl, hydroxyisopropyl, dihydroxypropyl, hydroxybutyl, hydroxyisobutyl, dihydroxybutyl, hydroxyamyl, hydroxyisoamyl, dihydroxyamyl; etc. Illustrative examples of radicals represented by R''' in Formula I are the same alkyl and hydroxyalkyl radicals just given with reference to R'' and, in addition, the higher alkyl radicals, e. g., hexyl to octadecyl, inclusive; the higher hydroxyalkyl radicals containing, for example, from 6 to 18 carbon atoms, inclusive; and the various aralkyl radicals, e. g., benzyl, phenylethyl, phenylpropyl, phenylisopropyl, phenylbutyl, etc. Illustrative examples of anions represented by Y in Formula I are the halide ions (that is, Y can represent halogen, more particularly chlorine, bromine, fluorine or iodine), sulfate, sulfonate, phosphate, hydroxide, borate, cyanide, carbonate, thiocyanate, thiosulfate, isocyanate, sulfite, bisulfite, nitrate, nitrite, oxalate, silicate, sulfide, cyanate, acetate and the other common inorganic and organic ions.

Specific examples of unsaturated quaternary ammonium compounds embraced by Formula I are:

Allyl gamma-myristamidopropyl dimethyl ammonium chloride
Methallyl gamma-caprylamidopropyl methyl ethyl ammonium bromide
Allyl gamma-caprylamidopropyl methyl benzyl ammonium phosphate
Ethallyl gamma-myristamidopropyl methyl alpha-naphthylmethyl ammonium chloride
Allyl gamma-palmitamidopropyl ethyl hexyl ammonium sulfate
Methallyl gamma-lauramidopropyl diamyl ammonium phosphate
Propallyl gamma-oleamidopropyl methyl octadecyl ammonium chloride
Allyl gamma-lauramidopropyl diethyl ammonium phosphate
Methallyl gamma - caprylamidopropyl methyl beta'-hydroxyethyl ammonium bromide Allyl gamma-stearamidopropyl methyl dihydroxypropyl ammonium phosphate Methallyl gamma-stearamidopropyl bis(beta'-hydroxyethyl) ammonium sulfate Allyl gamma-lauramidopropyl benzyl beta'-hydroxyethyl ammonium chloride Methallyl gamma-abietamidopropyl hexyl gamma'-hydroxypropyl ammonium phosphate Other examples will be apparent to those skilled in the art from Formula I and from the numerous examples of anions represented by Y and of radicals represented by R, R', R'' and R''' that have been given hereinbefore with reference to the said formula. It also will be understood by those skilled in the art that the unsaturated quaternary ammonium compounds used in practicing the present invention are also embraced by the following general formula II 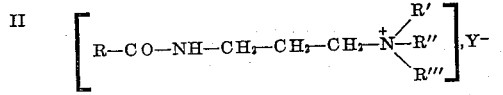

With further reference to Formulas I and II and the definition of R in the said formulas, it may be pointed out that the upper limit of the number of carbon atoms contained in the aliphatic or alicyclic hydrocarbon radical represented by R is not critical and is determined largely by the availability of the intermediates used in preparing the quaternary ammonium compound and the prticular properties desired in the copolymer made therefrom. Thus, for some purposes it may be desirable that R be a radical, more particularly an aliphatic or alicyclic hydrocarbon radical, containing from 7 to 19 carbon atoms, while for other purposes it may be desirable that R be an aliphatic or alicyclic hydrocarbon radical containing more than 19 carbon atoms, e. g., up to 31 carbon atoms.

Some of the quaternary ammonium compounds embraced by Formulas I and II are old and are disclosed, for example, in Patent No. 2,459,062 dated January 11, 1949 and in the copending application of Joseph J. Carnes, Serial No. 242,434 filed August 17, 1951, now Patent No. 2,626,877 dated January 27, 1953, in which patents general methods of preparation are given. See, also, Patent No. 2,589,674 dated March 18, 1952, and the copending application of Joseph J. Carnes, Serial No. 242,433, filed August 17, 1951, now Patent No. 2,626,876 dated January 27, 1953, for additional information on the preparation of somewhat similar quaternary ammonium compounds containing hydroxyalkyl groups (but no ethylenically unsaturated groups) attached to the ammonium nitrogen atom.

It is one of the primary objects of the present invention to provide a new class of copolymers or interpolymers for use in industry.

Still another and important object of the invention is the production of copolymers or interpolymers of a basic monomer, more particularly an unsaturated quaternary ammonium compound of the kind embraced by Formula I, and one or more non-basic monomers, e. g., acrylonitrile, which polymerization products are more readily dyed, especially with acid dyes, than polymers of acrylonitrile or other non-basic monomer alone, or than many of the previously known or suggested copolymers of (1) acrylonitrile (or other non-basic monomer) and (2) another different monomer or monomers.

Another object of the invention is to prepare copolymers which can be spun or otherwise shaped to form filaments, tapes, ribbons, tubes, rods, sheets, etc., and the shaped articles then dyed either before or after having been oriented or treated to improve their useful properties.

Another object of the invention is to prepare copolymers, especially acrylonitrile copolymers, which, when shaped into films, filaments, etc., are resistant to the accumulation of static charges of electricity.

Still another object of the invention is to increase the field of utility of quaternary ammonium compounds of the kind embraced by Formula I.

Other objects of the invention will be apparent to those skilled in the art from the description and examples which follow.

The foregoing objects are attained by copolymerization of copolymerizable ingredients including (1) an unsaturated quaternary ammonium compound of the kind embraced by Formula I (or a plurality of such compounds) and (2) one or more other comonomers which are copolymerizable therewith, more particularly such comonomers which contain either a single or a plurality of $CH_2=C<$ groupings. These ingredients are used in weight proportions of from about 1% to about 50%, preferably (for the usual applications) from about 1 or 2% to about 15 or 20%, or, in some cases up to about 25 or 30%, of the unsaturated quaternary ammonium compound, e. g., an allyl myristamidopropyl dimethyl ammonium salt, an allyl stearamidopropyl dimethyl ammonium salt, an allyl stearamidopropyl methyl benzyl ammonium salt, an allyl myristamidopropyl dimethyl ammonium salt, an allyl lauramidopropyl dimethyl ammonium salt, etc., and from about 50% to about 99%, preferably (for the usual applications) from about 98 or 99% to about 80 or 85%, or, in some cases 70 or 75%, of a different comonomer (or comonomers) containing one or more $CH_2=C<$ groupings. Heat, light or heat and light can be used to effect or to accelerate polymerization of the mixture of comonomers, although under such conditions the rate of polymerization in some cases may be relatively slow, as for instance when the unsaturated quaternary ammonium compound constitutes only a small amount (e. g., 1 to 5%) of the mixture of comonomers and the other comonomer normally has a slow polymerization rate. Hence, it is usually preferred to accelerate the polymerization by employing a polymerization catalyst accompanied by heat, light or heat and light. Further details of polymerization conditions are given hereinafter.

Examples of monomers (comonomers) containing a $CH_2=C<$ grouping that can be copolymerized with an unsaturated quaternary ammonium compound of the kind embraced by Formula I, in the weight proportions hereinbefore mentioned, singly or a plurality (two, three, four or any desired number) thereof, the latter often being desirable in order to improve the compatibility and copolymerization characteristics of the mixture of monomers and to obtain new and valuable copolymers having the particular properties desired for a particular service application, are such monomers as the unsaturated alcohol esters, more particularly the allyl, methallyl, crotyl, 1-chloroallyl, 2-chloroallyl, cinnamyl, vinyl, methvinyl, 1-phenylallyl, butenyl, etc., esters of saturated and unsaturated, aliphatic and aromatic, monobasic and polybasic acids such, for instance, as acetic, propionic, butyric, valeric, caproic, acrylic and alpha-substituted acrylic (including alkacrylic, e. g., methacrylic, ethacrylic, propacrylic etc., and arylacrylic, e. g., phenylacrylic, etc.), crotonic, oxalic, malonic, succinic, glutaric, adipic, pimelic, suberic, azelaic, sebacic, fumaric, citraconic, mesaconic, itaconic, acetylene dicarboxylic, aconitic, benzoic, phenylacetic, phthalic, terephthalic, benzoylphthalic, etc., acids; the saturated monohydric alcohol esters, e. g., the methyl, ethyl, propyl, isopropyl, butyl, sec.-butyl, amyl, etc., esters of unsaturated aliphatic monobasic and polybasic acids, illustrative examples of which appear above; vinyl cyclic compounds (including monovinyl aromatic hydrocarbons), e. g., styrene, o-, m- and p-chlorostyrenes, -bromostyrenes, -fluorostyrenes, -methylstyrenes, -ethylstyrenes, -cyanostyrenes, the various polysubstituted styrenes such, for example, as the various di-, tri- and tetrachlorostyrenes, -bromostyrenes, -fluorostyrenes, -methylstyrenes, -ethylstyrenes, -cyanostyrenes, etc., vinyl naphthalene, vinylcyclohexane, vinyl furane, vinyl pyridine, vinyldibenzofuran, divinyl benzene, trivinyl benzene, allyl benzene, diallyl benzene, N-vinyl carbazole and the various allyl cyanostyrenes; the various alpha-substituted styrenes and alpha-substituted ring-substituted styrenes, e. g., alpha-methyl-paramethyl styrene, etc.; unsaturated ethers, e. g., ethyl vinyl ether, diallyl ether, ethyl methallyl ether, etc.; unsaturated amides, for instance N-allyl caprolactam, acrylamide, and N-substituted acrylamides, e. g., N-methylol acrylamide, N-allyl acrylamide, N-methyl acrylamide, N-phenyl acrylamide, etc.; unsaturated ketones, e. g., methyl vinyl ketone, methyl allyl ketone, etc.; methylene malonic esters, e. g., methylene methyl malonate, etc.; butadienes, e. g., 1,3-butadiene, 2-chlorobutadiene, etc.; ethylene, especially in conjunction with one or more other comonomers; unsaturated polyhydric alcohol (e. g., butenediol, etc.) esters of saturated and unsaturated, aliphatic and aromatic, monobasic and polybasic acids, illustrative examples of which appear above; unsaturated glycidyl esters such as glycidyl acrylate, glycidyl methacrylate, glycidyl itaconate, glycidyl allyl phthalate, etc.

Other examples of monomers that can be copolymerized with an unsaturated quaternary ammonium compound of the kind embraced by Formula I to produce my new copolymer compositions are the vinyl halides, more particularly vinyl fluoride, vinyl chloride, vinyl bromide and vinyl iodide, and the various vinylidene compounds, including the vinylidene halides, e. g., vinylidene chloride, vinylidene bromide, vinylidene fluoride and vinylidene iodide, other comonomers being added if needed in order to improve the compatability and copolymerization characteristics of the mixed monomers.

Other and more specific examples of monomeric materials which can be mixed or blended with an unsaturated quaternary ammonium compound of the kind used in practicing the present invention, in the aforementioned proportions, and the resulting homogeneous or substantially homogeneous, polymerizable composition then polymerized, as hereinafter more fully described, to yield new and valuable copolymer compositions are the allyl compounds which are different from the quaternary ammonium compound used in practicing the present invention and especially those which have a boiling point of at least about 60° C. Of the monomeric materials which can be used the allyl esters form a large class. The reactive allyl compounds employed are preferably those which have a high boiling point such, for example, as diallyl maleate, diallyl fumarate, diallyl phthalate, diallyl succinate, etc. Other allyl compounds which are not necessarily high boiling also may be used.

Additional examples of allyl compounds, and of other compounds containing one or more $CH_2=C<$ groupings that can be used in producing the new and useful copolymers or interpolymers of the present invention, are given in, for example, Drechsel and Padbury Patent No. 2,550,652 dated April 24, 1951, and especially in that portion thereof with particular reference to monomers used in forming copolymers with diallyl cyanamide.

Among the comonomers which are preferred for use in carrying my invention into effect are the vinyl compounds which are different from the unsaturated quaternary ammonium compound employed, including the vinyl aromatic compounds, more particularly the vinyl aromatic hydrocarbons (e. g., styrene, the various dialkyl styrenes, etc.), and the vinyl aliphatic compounds, e. g., acrylonitrile, acrylamide, etc., and other and different compounds containing a $CH_2=C<$ grouping, e. g., isopropenyl toluene, the various substituted acrylonitriles (e. g., methacrylonitrile, ethacrylonitrile, phenylacrylonitrile, etc.) the various substituted acrylamides (e. g., methacrylamide, ethacrylamide, the various N-substituted acrylamides and alkacrylamides, for instance N-methylol acrylamide, N-monoalkyl and -dialkyl acrylamides and methacrylamides, e. g., N-monomethyl, -ethyl, -propyl, -butyl, etc., and N-dimethyl, -ethyl, -propyl, -butyl, etc., acrylamides and methacrylamides, N-monoaryl and -diaryl acrylamides and alkacrylamides, e. g., N-monophenyl and -diphenyl acrylamides and methacrylamides, etc.), vinyl esters, e. g., vinyl acetate, vinyl propionate, vinyl butyrate, vinyl isobutyrate, vinyl valerate, vinyl acrylate, vinyl methacrylate, etc., esters of an acrylic acid (including acrylic acid itself and the various alpha-substituted acrylic acids, e. g., methacrylic acid, ethacrylic acid, phenylacrylic acid, etc.), more particularly the alkyl esters of an acrylic acid, e. g., the methyl, ethyl, propyl, isopropyl, n-butyl, isobutyl, sec.-butyl, tert.-butyl, amyl, hexyl, heptyl, octyl, decyl, dodecyl, etc., esters of acrylic, methacrylic, ethacrylic, phenylacrylic, etc., acids, including the alkyl acrylates containing not more than four carbon atoms in the alkyl grouping, examples of which are given above, as well as other vinyl aromatic and vinyl aliphatic compounds, and other compounds containing a $CH_2=C<$ grouping.

Any suitable means may be used in effecting polymerization of the admixture of the unsaturated quaternary ammonium compound and one or more other monomers which are copolymerizable therewith. As has been mentioned hereinbefore heat or light or both, with or without a polymerization catalyst, can be used. Ultraviolet light is more effective than ordinary light. Preferably a polymerization catalyst is employed. Any of the polymerization catalysts which are suitable for use in polymerizing compounds containing an ethylenically unsaturated grouping, specifically a vinyl grouping, can be employed. Among such catalysts are the inorganic peroxides, e. g., hydrogen peroxide, barium peroxide, magnesium peroxide, etc., and the various organic peroxy catalysts, illustrative examples of which latter are: the dialkyl peroxides, e. g., diethyl peroxide, dipropyl peroxide, dilauryl peroxide, dioleyl peroxide, di-(tert.-butyl) peroxide and di-(tert.-amyl) peroxide, such peroxides often being designated as ethyl, propyl, lauryl, oleyl, tert.-butyl and tert.-amyl peroxides; the alkyl hydrogen peroxides, e. g., tert.-butyl hydrogen peroxide (tert.-butyl hydroperoxide), tert.-amyl hydrogen peroxide (tert.-amyl hydroperoxide), etc.; symmetrical diacyl peroxides, for instance peroxides which commonly are known under such names as acetyl peroxide, propionyl peroxide, lauroyl peroxide, succinyl peroxide, phthaloyl peroxide, benzoyl peroxide, etc.; fatty oil acid peroxides, e. g., coconut oil acid peroxides, etc.; unsymmetrical or mixed diacyl peroxides, e. g., acetyl benzoyl peroxide, propionyl benzoyl peroxide, etc.; terpene oxides, e. g., ascaridole, etc.; and salts of inorganic peracids, e. g., ammonium persulfate, sodium persulfate, potassium persulfate, sodium percarbonate, potassium percarbonate, sodium perborate, potasium perborate, sodium perphosphate, potassium perphoshate, etc. Other examples of organic peroxides and of other catalysts that can be employed are given in the aforementioned Drechsel and Padbury Patent No. 2,550,652.

The concentration of the catalyst employed is usually small, that is, for the preferred catalysts from, by weight, about 0.5 or 1 part of catalyst per thousand parts of the polymerizable composition to be polymerized to about 3 or 4 or more parts of catalysts per 100 parts of the mixture of comonomers. If an inhibitor of the kind hereinafter mentioned be present, larger amounts of catalyst may be necessary according to the concentration of the inhibitor.

If desired, the mixed monomers can be polymerized in emulsion or in solution state to yield a copolymer. In the latter case, various inert organic solvents may be employed, depending upon the particular comonomer used, e. g., toluene, xylene, dioxane, ethers (e. g., dibutyl ether), esters (e. g., butyl acetate), chlorobenzene, ethylene dichloride, ketones (e. g., methyl ethyl ketone), tertiary alcohols, for instance tertiary-butyl alcohol, tertiary-amyl alcohol, tertiary-hexyl alcohol, etc., as well as others. When the reaction is effected in solution state, then a temperature at or approaching the boiling temperature of the solution generally is used.

The polymerization also can be effected by conventional bulk polymerization technique, in the presence or absence of a solvent capable of dissolving the monomeric mixture and in which the latter preferably is inert; or in solution in a solvent in which the monomeric mixture is soluble but the copolymer is insoluble; or by conventional bead polymerization methods. The polymerization of the mixture of monomers can be effected by a continuous process as well as by a batch operation.

The temperature of polymerization of the polymerizable composition, at atmospheric or slightly above atmospheric pressure and in the presence or absence of a polymerization catalyst, can be varied over a wide range, up to and including or slightly above the boiling point (at atmospheric pressure) of the monomeric mixture (or of the lowest boiling component thereof), but in all cases is below the decomposition temperature of the monomeric materials. In most cases the polymerization temperature will be within the range of 15° C. to 150° C., more particularly within the range of 20° C. or 30° C. (ordinary room temperature) to 130° C., depending upon the particular mixture of monomers employed, the particular catalyst, if any, used, the rapidity of polymerization wanted, and other influencing factors. With certain catalysts, more particularly strong acidic polymerization catalysts such, for instance, as gaseous boron trifluoride-ethyl ether complex, concentrated sulfuric acid, anhydrous aluminum chloride, etc., a substantially lower polymerization temperature often advantageously may be used, e. g., temperatures ranging between −80° C. and 0° C. or 10° C. At the lower temperatures below the solidification point of the monomeric mixture (or components thereof), polymerization is effected while the mixture of monomers is dissolved or dispersed in a solvent or dispersion medium which is liquid at the temperature of polymerization. Or, if desired, the monomeric mixture, that is the polymerizable composition, can be polymerized in dissolved or dispersed state at temperatures above its solidification point or above the solidification point of the polymerizable components thereof. The copolymer can be separated from the liquid medium in which copolymerization was effected by any suitable means, e. g., by filtration, centrifuging, solvent extraction, etc.

In order that those skilled in the art may better understand how the present invention can be carried into effect, the following examples are given by way of illustration and not by way of limitation. All parts and percentages are by weight.

EXAMPLE 1

This example illustrates the preparation of homo-polymeric acrylonitrile, which is subsequently employed in comparative tests with certain of the copolymers of the present invention.

A reaction vessel, equipped with a stirrer, reflux condenser, thermometer and gas-inlet tube, is placed in a constant-temperature bath which is maintained at 35° C. To the vessel is added a solution of 53.0 parts of acrylonitrile, 900 parts of distilled water and 0.29 part of sulfuric acid. The pH of the initial solution is 3.1. A rapid stream of pre-purified nitrogen is passed over the surface of the solution for 30 minutes. The nitrogen flow is then reduced to about one bubble per second. A reduction-oxidation catalyst system ("redox" system) consisting of 1.71 parts of ammonium persulfate and 0.71 part of sodium meta-bisulfite, each dissolved in 50 parts of water, is then added. The solution first becomes cloudy at the end of 3 minutes, and the polymerization is fairly exothermic for the first half hour. The polymerization is continued for a total of 4 hours at 35° C. The polymer is collected on a Büchner funnel, and washed with 1000 parts of distilled water followed by about 160 parts of methanol. The polymer is dried in an oven at 70° C. for about 16 hours. The yield of dry polyacrylonitrile, which is white, amounts to 48 parts.

EXAMPLE 2

A. *Preparation of allyl gamma-stearamidopropyl dimethyl ammonium bromide*

To a reaction vessel are added 10 parts of gamma-stearamidopropyl dimethyl amine, 10 parts of allyl bromide and 20 parts of benzene. The solution becomes quite warm and the product slowly crystallizes from the solution. After about 4 hours the product is collected on a sintered glass funnel and dried in a vacuum desiccator. Eleven parts of light cream-colored allyl gamma-stearamidopropyl dimethyl ammonium bromide is obtained.

To a reaction vessel are added 2 parts of the above quaternary ammonium compound, 18 parts of water and 0.04 part of ammonium persulfate. The solution is heated on a steam bath for 2 hours, at the end of which period the solution is quite viscous. Upon cooling, a gel of homopolymeric allyl gamma-stearamidopropyl dimethyl ammonium bromide forms.

B. *Copolymer of acrylonitrile and allyl gamma-stearamidopropy dimethyl ammonium bromide*

To a reaction vessel equipped as in Example 1 are added 45 parts of acrylonitrile, 5 parts of allyl gamma-stearamidopropyl dimethyl ammonium bromide and 900 parts of water. The pH of this solution is 3.5. A rapid stream of pre-purified nitrogen gas is passed over the surface of the solution for 30 minutes. The nitrogen flow is then reduced to about one bubble per second. To the vessel are then added 1 part of ammonium persulfate and 0.4 part of sodium meta-bisulfite, each dissolved in 50 parts of water. The polymerization is carried out for 7 hours at 60° C. The copolymer that forms is collected on a Büchner funnel, washed with 2000 parts of water and then dried in an oven at 70° C. for about 16 hours. The yield of dry, light cream-colored copolymer of acrylonitrile and allyl gamma-stearamidopropyl dimethyl ammonium bromide amounts to 40 parts.

EXAMPLE 3

Exactly the same procedure is followed as described under B of Example 2 with the exception that 48 parts instead of 45 parts of acrylonitrile is used, 2 parts of allyl gamma-caprylamidopropyl bis(beta'-hydroxyethyl) ammonium phosphate is employed in place of 5 parts of allyl gamma-stearamidopropyl dimethyl ammonium bromide, and the polymerization time is 10 hours at 60° C. instead of 7 hours at this temperature. A portion of the dry copolymer of acrylonitrile and allyl gamma-caprylamidopropyl bis(beta'-hydroxyethyl) ammonium phosphate is used in the dye tests described in a later example.

EXAMPLE 4

Same as in Example 2 with the exception that 35 parts instead of 45 parts of acrylonitrile is used, 15 parts of methallyl gamma-lauramidopropyl methyl benzyl ammonium chloride is employed in place of 5 parts of allyl gamma-stearamidopropyl dimethyl ammonium bromide, and the polymerization time is 20 hours at 60° C. A portion of the dry copolymer of acrylonitrile and methallyl gamma-lauramidopropyl methyl benzyl ammonium chloride is used in the dye tests described in a later example.

EXAMPLE 5

A. *Preparation of allyl gamma-lauramidopropyl dimethyl ammonium bromide*

To a reaction vessel are added 20 parts of gamma-lauramidopropyl dimethyl amine and 20 parts of allyl bromide. The reaction is quite exothermic, although no product precipitates from solution. At the end of 4 hours the solution is evaporated to dryness. The residue comprising allyl gamma-lauramidopropyl dimethyl ammonium bromide is a tan, waxy, water-soluble solid. The yield amounts to 26.8 parts.

B. *Copolymer of acrylonitrile, methyl acrylate and allyl gamma-lauramidopropyl dimethyl ammonium bromide*

To a reaction vessel are added 90 parts of acrylonitrile, 5 parts of methyl acrylate, 5 parts of allyl gamma-lauramidopropyl dimethyl ammonium bromide, 900 parts of water and 1 part of potassium persulfate. The solution is refluxed on a steam bath for 5 hours. The resulting copolymer, more particularly tripolymer, is collected on a Büchner funnel, washed with 2000 parts of water and dried in an oven at 70° C. for 2 hours. The yield of dry, white tripolymer of acrylonitrile, methyl acrylate and allyl gamma-lauramidopropyl dimethyl ammonium bromide amounts to 88 parts. A portion of the dry tripolymer is used in the dye tests described in a later example.

EXAMPLE 6

Exactly the same procedure is followed as described under B of Example 5 with the exception that the copolymerizable ingredients and proportions thereof employed are 90 parts of acrylonitrile, 5 parts of acrylamide and 5 parts of allyl gamma-myristamidopropyl methyl beta'-hydroxyethyl ammonium chloride, and the reflux time is 6 hours instead of 5 hours. A portion of the dry copolymer, specifically tripolymer, of acrylonitrile, acrylamide and allyl gamma-myristamidopropyl methyl beta'-hydroxyethyl ammonium chloride is used in the dye tests described in a later example.

EXAMPLE 7

Same as in Example 6 with the exception that the copolymerizable ingredients and proportions thereof employed are 88 parts of acrylonitrile, 4 parts of acrylamide, 4 parts of methyl acrylate and 4 parts of methallyl gamma-stearamidopropyl benzyl beta'-hydroxyethyl ammonium phosphate, and the reflux time is 12 hours instead of 6 hours as in Example 6. A portion of the dry copolymer, specifically tetrapolymer, of acrylonitrile, acrylamide, methyl acrylate and methallyl gamma-stearamidopropyl benzyl beta'-hydroxyethyl ammonium phosphate is employed in the dye tests described in a later example.

EXAMPLE 8

Samples of the homopolymeric acrylonitrile of Example 1 and of the acrylonitrile copolymers of Examples 2 to 7, inclusive, are subjected to the following dye test:

A sample (5 parts) of the dry polymer or copolymer is added to a dye bath consisting of 500 parts of an aqueous solution containing 0.2 part of concentrated sulfuric acid, 1 part of sodium sulfate and 0.2 part of Calcocid Alizarine Blue SAPG (color index No. 1054). The dye bath is boiled for 30 minutes, after which the polymerization product is filtered off and washed with hot water until the water is free of dye. The copolymers of Examples 2 to 7, inclusive, are dyed blue, the intensity being, in general, directly proportional to the percentage of the unsaturated quaternary ammonium compound used in forming the copolymer; that is, copolymers containing the higher content of the quaternary ammonium compound yield, in general, the deeper dyeings. In marked contrast, the homopolymeric acrylonitrile of Example 1 fails to absorb any dye. The advantage of modifying an acrylonitrile polymerization product by replacing a part (e. g., up to about 50% but, preferably, from about 1% to not more than about 15 or 20%, and still more particularly from 2 or 3% to 8 or 10%) of the initial acrylonitrile with an unsaturated quaternary ammonium compound of the kind embraced by Formula I, thereby to obtain a copolymeric

EXAMPLE 9

A. *Preparation of methallyl gamma-myristamidopropyl dimethyl ammonium chloride*

A solution consisting of 100 parts of gamma-myristamidopropyl dimethyl amine and 100 parts of methallyl chloride is refluxed for 4 hours in a reaction vessel placed on a steam bath, after which the solution is evaporated to dryness. The residue comprising methallyl gamma-myristamidopropyl dimethyl ammonium chloride is a brown, viscous mass which is soluble in water.

B. *Copolymer of methyl methacrylate and methallyl gamma-myristamidopropyl dimethyl ammonium chloride*

To a reaction vessel are added 20 parts of gamma-myristamidopropyl dimethyl ammonium chloride, 80 parts of methyl methacrylate, 300 parts of water and 1 part of ammonium persulfate. The resulting emulsion is heated on a steam bath for 16 hours. The emulsion is broken by the addition of 100 parts of isopropanol and the copolymeric product is then collected on a Büchner funnel, washed with 1000 parts of water and dried in an oven at 70° C. for 2 hours. The dry, white copolymer of methyl methacrylate and methallyl gamma-myristamidopropyl dimethyl ammonium chloride is obtained in a yield amounting to 86 parts. It may be used alone, or admixed with dyes, pigments, fillers, opacifiers, etc., as a molding (moldable) composition from which molded articles for various uses can be made.

EXAMPLE 10

A. *Preparation of allyl gamma-myristamidopropyl dimethyl ammonium chloride*

To a reaction vessel are added 100 parts of gamma-myristamidopropyl dimethyl amine and 100 parts of allyl chloride. The vessel is tightly stoppered and allowed to stand for 24 hours. During the first 2 hours the reaction is somewhat exothermic. The product is precipitated from solution by freezing in a Dry-Ice bath. The product is collected on a Büchner funnel and dried in a vacuum desiccator for 1 hour. Sixty (60) parts of dry, white, water-soluble allyl gamma-myristamidopropyl dimethyl ammonium chloride is obtained.

B. *Copolymer of styrene and allyl gamma-myristamidopropyl dimethyl ammonium chloride*

To a reaction vessel are added 20 parts of allyl gamma-myristamidopropyl dimethyl ammonium chloride, 80 parts of styrene, 300 parts of water and 1 part of ammonium persulfate. The resulting emulsion is heated on a steam bath for 16 hours. The emulsion is broken by the addition of 100 parts of isopropanol and the copolymeric product is then collected on a Büchner funnel, washed with 1000 parts of water and dried in an oven at 70° C. for 2 hours. The dry, white copolymer of styrene and allyl gamma-myristamidopropyl dimethyl ammonium chloride is obtained in a yield amounting to about 85 parts.

EXAMPLE 11

A solution is prepared by dissolving 10 parts of a copolymer of acrylonitrile and allyl gamma-stearamidopropyl dimethyl ammonium bromide (the preparation of which is described in Example 2) in 90 parts of dimethylformamide. Tough, transparent films are obtained from this solution by spreading a sample of the solution over a glass plate and evaporating off the dimethylformamide in a forced draft oven at 100°–110° C. for a period of about 10 minutes. As a simple test for qualitatively determining the resistance of the film to the accumulation of static charges of electricity, the dry film is rubbed vigorously with a piece of woolen cloth and immediately placed about 1 inch above a Petri dish containing some cigarette ashes. Only a few particles are attracted to the film. In marked contrast, when a film is similarly produced from a dimethylformamide solution of the homopolymeric acrylonitrile of Example 1, and the film is then tested in identically the same manner, a very large number of cigarette ash particles are attracted to the film, indicating that the film readily accumulates static charges of electricity and, therefore, has poor antistatic properties. The advantages of creating a copolymer in which an antistatic agent has been incorporated as an integral part of the copolymer molecule, with the result that the copolymer has inherent antistatic characteristics, therefore, are quite apparent. Specifically, it obviates the necessity for a separate physical treatment of an article formed of an unmodified polymerization product with an antistatic agent in order to impart antistatic characteristics thereto.

It will be understood, of course, by those skilled in the art that my invention is not limited to the specific ingredients or proportions thereof, or to the particular methods of preparation, that are given by way of illustration in the foregoing examples. Thus, instead of the particular unsaturated quaternary ammonium compounds given by way of illustration in the above examples, I may use any other quaternary ammonium compound or plurality of compounds of the kind embraced by Formula I. Likewise, instead of the particular comonomers containing a $CH_2=C<$ grouping that are given in the individual examples, I may use any other such compound, or a plurality thereof, which are copolymerizable with the unsaturated quaternary ammonium compound, numerous examples of which were given in the portion of this specification prior to the examples.

Although many of the new copolymers of this invention, especially the acrylonitrile copolymers, are particularly useful in the formation of fibers or filaments, which are more ammenable to dieing than products comprising homopolymeric acrylonitrile, they also have numerous other applications in the plastics and coating arts. For instance, with or without a filler or other additive, they may be used as molding compositions or as components of molding compositions from which molded articles are produced by molding the composition under heat and pressure, e. g., at temperatures of the order of 130° C. or 140° C. to 200° C. and under pressures up to 10,000 lbs. or more per square inch. Among the fillers that can be employed in the production of molding compositions are alpha-cellulose pulp, asbestos fibers, cotton flock, chopped cloth cuttings, glass fibers, wood flour, antimony oxide, titanium dioxide, sand, clay, mica dust, diatomaceous earth, etc.

The copolymers of my invention are particularly valuable in all applications where it is desired to modify a polymerization product (the monomer of which contains a $CH_2=C<$ grouping) which normally tends to accumulate static charges of electricity and, as a result, is unsuitable for applications where an article formed of such a polymerization product would be exposed to charges of static electricity. By incorporating an unsaturated quaternary ammonium compound of the kind embraced by Formula I into such a polymerization product, so that the quaternary ammonium compound becomes an integral part of the molecule, a product is obtained which is highly resistant to the accumulation of electrical charges and, therefore, is more valuable and more useful than a similar polymerization product which is lacking in these properties.

Polylmerizable compositions of my invention can be used in the production of castings of any desired shape or size; as adhesives; in the treatment of paper or paper stock; in coating compositions; and for various other purposes. The copolymer can be formed in situ after application of the monomeric mixture to the base material to be coated, impregnated or otherwise treated.

Fibers can be produced from many of the copolymers, especially the acrylonitrile copolymers, of the present invention, for instance in the manner described in, for example, Patents 2,558,730, -731 and -733 with particular reference to the production of a molecularly oriented fiber from homopolymeric or copolymeric acrylonitrile. The unoriented and oriented fibers produced from my new copolymers are readily dyed, especially with an acid dye, while the fiber is in either a gel (e. g., hydrogel or aquagel) or a dry state.

The new materials (polymerizable compositions and polymerization products) of this invention have numerous other uses, for example uses such as are given in the aforementioned Drechsel and Padbury Patent No. 2,550,652.

Many of the monomeric unsaturated quaternary ammonium compounds used in producing the new copolymers disclosed and claimed herein also may be polymerized alone to form homopolymers which are useful in industry, e. g., as a modifier of polymeric or copolymeric acrylinitrile (wherein no basic monomer is chemically combined in the copolymer) to improve the dyeability of the acrylonitrile polymerization product, especially toward acid dyes. Copolymers also can be produced from a mixture of copolymerizable monomers consisting of substantially more than 50% by weight thereof of a quaternary ammonium compound of the kind embraced by Formula I and the remainder a different compound containing a $CH_2=C<$ grouping. In general, however, such proportions yield copolymers having no particular advantages, for the usual applications, over the products obtained by polymerizing a mixture of comonomers that contains 50% or less, by weight, of the quaternary ammonium compound and have the disadvantage, in general, of yielding a monomeric mixture which is less responsive to the usual polymerization conditions, e. g., time, temperature and catalyst required.

I claim:

1. A polymerizable composition comprising (1) a quaternary ammonium compound represented by the general formula

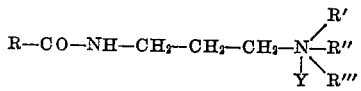

where R represents an aliphatic hydrocarbon radical containing at least 7 carbon atoms, R' represents an ethylenically unsaturated hydrocarbon radical having a terminal

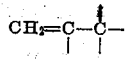

grouping and containing from 3 to 10 carbon atoms, inclusive, R'' represents a radical selected from the class consisting of alkyl and hydroxyalkyl radicals containing from 1 to 5 carbon atoms, inclusive, R''' represents a radical selected from the class consisting of alkyl, hydroxyalkyl and aralkyl radicals, and Y represents an anion, and (2) a compound which is different from the compound of (1), is copolymerizable therewith and contains a $CH_2=C<$ grouping, the quaternary ammonium compound of (1) constituting from about 1% to about 50% by weight of the total amount of (1) and (2).

2. A polymerizable composition as in claim 1 wherein R' represents an allyl radical.

3. A polymerizable composition as in claim 1 wherein R' represents a methallyl radical.

4. A product comprising the polymerized composition of claim 1.

5. A composition comprising a copolymer of copolymerizable ingredients including (1) a quaternary ammonium compound represented by the general formula

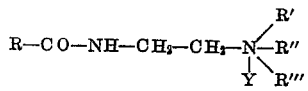

where R represents an aliphatic hydrocarbon radical containing at least 7 carbon atoms, R' represents an ethylenically unsaturated hydrocarbon radical having a terminal

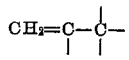

grouping and containing from 3 to 10 carbon atoms, inclusive, R'' represents a radical selected from the class consisting of alkyl and hydroxyalkyl radicals containing from 1 to 5 carbon atoms, inclusive, R''' represents a radical selected from the class consisting of alkyl, hydroxyalkyl and aralkyl radicals, and Y represents an anion, and (2) a compound which is different from the compound of (1), is copolymerizable therewith and contains a $CH_2=C<$ grouping, the quaternary ammonium compound of (1) constituting from 1% to 30% by weight of the total amount of (1) and (2).

6. A composition as in claim 5 wherein the compound of (2) is a vinyl compound.

7. A composition as in claim 6 wherein the vinyl compound is a vinyl aromatic compound.

8. A composition as in claim 7 wherein the vinyl aromatic compound is a vinyl aromatic hydrocarbon.

9. A composition as in claim 8 wherein the vinyl aromatic hydrocarbon is styrene.

10. A composition as in claim 6 wherein the vinyl compound is a vinyl aliphatic compound.

11. A composition as in claim 10 wherein the vinyl aliphatic compound is acrylonitrile.

12. A composition as in claim 10 wherein the vinyl aliphatic compound is an alkyl ester of an acrylic acid.

13. A composition as in claim 5 wherein the quaternary ammonium compound of (1) is an allyl myristamidopropyl dimethyl ammonium salt.

14. A composition as in claim 5 wherein the quaternary ammonium compound of (1) is an allyl stearamidopropyl dimethyl ammonium salt.

15. A composition as in claim 5 wherein the quaternary ammonium compound of (1) is a methallyl myristamidopropyl dimethyl ammonium salt.

16. A composition as in claim 5 wherein the quaternary ammonium compound of (1) is an allyl lauramidopropyl dimethyl ammonium salt.

17. The method of preparing a new synthetic composition which comprises polymerizing a polymerizable composition comprising (1) a quaternary ammonium compound represented by the general formula

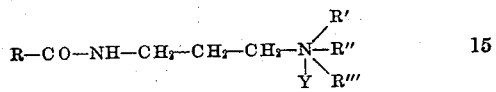

where R represents an aliphatic hydrocarbon radical containing at least 7 carbon atoms, R' represents an ethylenically unsaturated hydrocarbon radical having a terminal

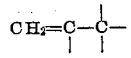

grouping and containing from 3 to 10 carbon atoms, inclusive, R'' represents a radical selected from the class consisting of alkyl and hydroxyalkyl radicals containing from 1 to 5 carbon atoms, inclusive, R''' represents a radical selected from the class consisting of alkyl, hydroxyalkyl and aralkyl radicals, and Y represents an anion, and (2) a compound which is different from the compound of (1), is copolymerizable therewith and contains a $CH_2=C<$ grouping, the quaternary ammonium compound of (1) constituting from about 1% to about 50% by weight of the total amount of (1) and (2).

JOHN A. PRICE.

References Cited in the file of this patent

Butler et al., Jour. Am. Chem. Soc., vol. 71, pages 3120–3123, September 1949.